(12) United States Patent
Hendler et al.

(10) Patent No.: US 7,503,288 B2
(45) Date of Patent: Mar. 17, 2009

(54) PLASTIC BOILER WITHOUT FLANGE

(76) Inventors: René Hendler, Holzleithen 29, Franking (AT) 5131; Johann Höfer, Krögner Weg 19, St. Georgen (AT) A-5113; Andreas Pleschinger, Stadlweg 15, Anthering (AT) 5102

( * ) Notice: Subject to any disclaimer, the term of this patent is extended or adjusted under 35 U.S.C. 154(b) by 20 days.

(21) Appl. No.: 11/446,582

(22) Filed: Jun. 2, 2006

(65) Prior Publication Data
US 2007/0081801 A1    Apr. 12, 2007

(30) Foreign Application Priority Data
Jun. 10, 2005    (DE) ................ 10 2005 026 919

(51) Int. Cl.
*F24D 19/00*    (2006.01)
(52) U.S. Cl. ............ 122/15.1; 122/13.01; 392/322
(58) Field of Classification Search ........... 122/15.1, 122/13.01, 18.1, 33, 31.2; 392/322, 449; 432/225
See application file for complete search history.

(56) References Cited
U.S. PATENT DOCUMENTS 3,854,454 A * 12/1974 Lazaridis ............ 122/33
3,860,787 A * 1/1975 Strobach ............ 392/457
4,637,347 A * 1/1987 Troy ............ 122/15.1
4,874,104 A * 10/1989 Klammer et al. ............ 220/4.21
5,256,267 A * 10/1993 Roden ............ 204/196.11
6,885,816 B1 * 4/2005 Hicks et al. ............ 392/451

FOREIGN PATENT DOCUMENTS

| DE | 75 12 731 | 10/1975 |
|---|---|---|
| DE | 34 04 840 C2 | 8/1984 |
| EP | 1 211 466 A2 | 6/2002 |

* cited by examiner

*Primary Examiner*—Gregory A Wilson
(74) *Attorney, Agent, or Firm*—Seed Intellectual Property Law Group PLLC (57) ABSTRACT

A boiler for heating a flow capable medium, especially for heating water, comprising a boiler housing made from plastic and a heater protruding through a mounting hole in the boiler housing into the interior of the boiler housing, being fixated in the mounting hole through a fixation means. Furthermore the interior diameter of the mounting hole in the boiler housing is at least in sections approximately identical to the outer diameter of the heater and the heater has an unheated section in the area of the mounting hole.

27 Claims, 12 Drawing Sheets

PLASTIC BOILER WITHOUT FLANGE

BACKGROUND OF THE INVENTION

1. Field of the Invention

The present invention regards a plastic boiler for heating flow capable media, especially water.

2. Description of the Related Art

Boilers of this kind are being used in coffee makers, espresso machines and so forth. So far these boilers were made of metal. Due to the high cost of metal material these boilers were expensive to produce. Furthermore, the manufacturing of metal parts is complex, which further increased production costs.

Therefore plastic boilers have already been in use. For instance, European patent application 1 211 466 shows a plastic boiler. This known plastic boiler consists of a top part and a bottom part. The heater consists of a tube heater element, which is inserted into the bottom part of the boiler via a large metal mounting flange. The mounting flange defines relatively large opening for receiving the heater element in the bottom part of the boiler. This opening has to be sealed with a suitable sealing means against the medium to be heated. Once again, the use of a metal flange increases manufacturing cost. Manufacturing cost is increased even more because of the special measures required to seal a large diameter opening.

BRIEF SUMMARY OF THE INVENTION

Therefore, it is one object of some embodiments to provide a plastic boiler as described above, wherein the heater can be mounted to the boiler in a simpler and less expensive way, compared to the state of the art.

Accordingly, a boiler for heating a flow capable medium, especially for heating water, comprising a boiler housing made from plastic and a heater protruding through a mounting hole in the boiler housing into the interior of the boiler housing, being fixated in the mounting hole through a fixation means, wherein the heater has an unheated section at least in the area of the mounting hole and the interior diameter of the mounting hole in the boiler housing is at least in sections at least approximately equivalent to the exterior diameter of the heater.

Through designing the heater with an unheated section at least in the area of the mounting system and through designing the opening in the boiler housing so its interior diameter is at least approximately equivalent to the exterior diameter of the heater at least in certain areas, it is possible to do without a dedicated mounting piece of sheet metal or a dedicated mounting flange. At the same time, the diameter of the mounting hole is greatly reduced. Therefore measures to improve the sealing action, when a metal mounting flange according to the state of the art is used to mount the heater in the boiler housing, can also be reduced.

In order to assure that the heat generated by the heater does not damage the plastic walls of the boiler housing, the unheated section of the heater can extend further on the inner wall of the boiler housing. Thus, the unheated section of the heater extends further into the interior of the boiler housing. The unheated section of the heater can also extend further on the exterior of the boiler housing. Furthermore, it is advantageous for the unheated section of the boiler housing to be larger in the direction of the inside of the boiler housing, than in the direction of the outside of the boiler housing.

The heater can be mounted in the mounting hole by various means. In case the heater is inserted into the mounting hole after the manufacture of the boiler housing, it is possible to perform this, depending on the design of the heater from the outside of the container as well as from the inside of the container. In case the mounting is performed from the inside of the container, which is especially advantageous, when the boiler housing consists of at least two housing sections, which are joined in a separate assembly step, the mounting hole can become smaller towards the exterior of the boiler housing. The mounting hole has a narrowed section, whereby interior diameter of the narrowed section is smaller than the exterior diameter of the heater and at which the heater abuts to the mounting hole. The narrowed section has an interior diameter such that a mounting element of the heater (e.g., a connecting bolt or similar device) can still pass through the narrowed section. Through simple means this design provides defined axial positioning of the heater through abutting the exterior facing front of the heater to the narrowed section.

Due to the high strength of certain plastics, the wall thickness of the housing can be kept rather small. In such a case, but also in general, the axial length of the mounting hole may be insufficient for safely mounting the heater. Therefore, it is furthermore advantageous to shape the mounting hole as an extension mounted to, or integrally formed with, the boiler housing or to extend the mounting hole by such an extension having a length in excess of the thickness of the wall of the boiler housing and preferably extending outward from the wall of the boiler housing.

It is certainly possible to place an extension only on the interior side of the boiler housing or to place an extension on the exterior and on the interior side of the boiler housing. Through the use of plastic material for the boiler housing this extension can be integrally created in a simple manner with the boiler housing during an injection molding process. It is certainly possible to manufacture the extension separate from the boiler housing and to subsequently mount it to the boiler housing in the mounting hole by a suitable mounting process, such that the middle longitudinal axis of the extension generally coincides with the middle longitudinal axis of the mounting hole.

In order to inhibit or substantially prevent the outflow of the flowable medium through the mounting hole of the heater, at least one gasket element can be located between the interior wall of the mounting hole and the exterior wall of the heater. The manufacturing process can be further simplified through spraying the gasket element onto the exterior side of the heater.

The fit between the interior wall of the mounting hole and the exterior wall of the heater can function as a fixation means. The heater is firmly mounted after inserting it into a mounting hole. The fit can be a tight fit or a press fit. Since the heater heats up and cools down in a cyclical manner, it is possible that the fit changes during the in service time of the heater and over the life of the boiler. Therefore, it may be advantageous to use a fixation means to hold the heater in the mounting hole. The fixation means can comprise at least one clamping element. The clamping element can hold the heater in the mounting hole through plastic deformation. This can, for example, be accomplished with a c-shaped metal clamping element, wherein the interior diameter of the clamping element is selected in a way that it can be mounted in the mounting hole of the boiler housing when mounting the heater, but wherein the clamping element is subsequently deformed plastically so it reaches behind an undercut in the wall of the boiler or in a provided extension. It is also possible to form the clamping element as a complete ring, preferably made from metal. The interior diameter of the ring is at least approximately equivalent to the exterior diameter of the extension. The fixation of the ring and the fixation of the heater can be accomplished through plastic deformation of the ring, preferably through reaching around the edges of the ring in the area of undercuts.

It has to be noted that depending on the design and/or the location of the mounting fixture it can serve as a mass connection for the heater.

It is also possible to integrally form the mounting fixture in one piece with the housing or with the extension of the mounting hole through injection molding. The fixation of the heater can also be accomplished through plastic deformation of the mounting fixture.

Furthermore, the mounting fixture can be mounted on an isolation bead, preferably made from plastic, which closes the mounting hole towards the outside of the boiler when the heater is mounted and/or closes the heater. Similar to the embodiments described above, the fixation of the heater in the mounting hole can also be accomplished through plastic deformation of the mounting fixture after inserting the heater into the mounting hole.

Besides the subsequent mounting of the heater in the mounting hole of the container housing (e.g., mounting it after the manufacture of the boiler housing or a segment of the boiler housing), it is possible to form the mounting hole by molding the boiler housing around the heater during the manufacture of the boiler housing. The heater is inserted into the injection molding machine when manufacturing the boiler housing or a section thereof and encased with plastic material. Thus, the heater is already fixated in the mounting hole when the boiler housing or a section thereof are removed from the injection molding machine. Hereby the assembly of a boiler becomes much easier. Furthermore, no additional mounting fixture is required, since the mounting fixture is provided through the encasement of the heater during the injection molding process. Certainly an additional mounting fixture can be provided, which is also inserted into the injection molding machine during the molding process of the boiler housing or a segment thereof, which additionally fixates the heater in the mounting hole after the manufacture of the boiler housing.

An additional way to design the mounting fixture comprises an expansion in the mounting hole towards the exterior of the boiler, which corresponds to an expansion in the heater. The expansion in the mounting hole can be provided during the manufacture of the boiler housing or during the manufacture of the part of the boiler housing, which contains the mounting hole for the heater, wherein the heater is inserted into the mounting hole and wherein subsequently a suitable component of the heater like the outer tube is expanded. In this manner, the heater is clamped into the mounting hole.

Besides the mounting hole for the heater, an additional mounting hole can be provided for the control unit, which is attached to the heated area of the heater via a heat conducting contact. This provides the possibility to establish a control process for the heater. Besides the mounting hole for the control system, additional mounting holes can be provided in the boiler housing, containing additional control elements and sensors (e.g., contamination sensors, pressure sensors, etc.).

The heat can be transferred through radiation or conduction. In order to establish a heat conducting contact, the heat is transferred through a piece of sheet metal.

The control system can include various components. The control system preferably includes at least one of a PTC-element or a NTC-element, and a melting fuse.

The control unit can be snapped into the mounting hole or it can be held by a mounting fixture. In principle it is also possible to insert the control unit into the injection molding machine during the injection molding process of the boiler housing or sections thereof in order to fixate it in the mounting hole.

As explained above, the boiler housing can consist of one piece or can comprise two or more housing sections. A very simple manufacturing process and simple assembly of the boiler are achieved when the boiler housing includes at least of two parts, wherein preferably at least one mounting hole for the heater and/or the mounting hole for the control unit are provided in one of the boiler sections. The two parts of the housing, with a gasket in between, can be connected materially, through interlocking and through compressing. A pressure connection is established through one or several metal clamps, which are mounted with a gasket element in between over the two abutting flange sections of the two housing parts during the assembly of the boiler. The metal clamp is provided in a way that it transfers an elastic clamping force to the two flanges. It is also possible to connect both housing parts through an interlocking connection or through one or more snapping hooks. Alternatively, the first boiler housing can have one or more plastic pins on its flange, reaching through a hole in the flange of the other boiler housing and being deformed through heating like a rivet at its free end so it reaches over the rim of the hole in the flange. Eventually both housing parts can be materially connected, for example, through gluing or welding.

Different solutions can be used for the heater. In some embodiments, the use of a tubular heater in connection with the boiler provides further advantages.

BRIEF DESCRIPTION OF THE SEVERAL VIEWS OF THE DRAWINGS

Other advantageous configurations of the plastic boiler as well as design examples, as well as embodiments thereof shall now be described with reference to the attached drawings. The terms "left", "right", "bottom" and "top" used when describing the embodiments relate to the attached drawings oriented in such a way that the reference numerals and names of the figures can be read normally. Herein shows.

DETAILED DESCRIPTION OF THE INVENTION

Figure 1:
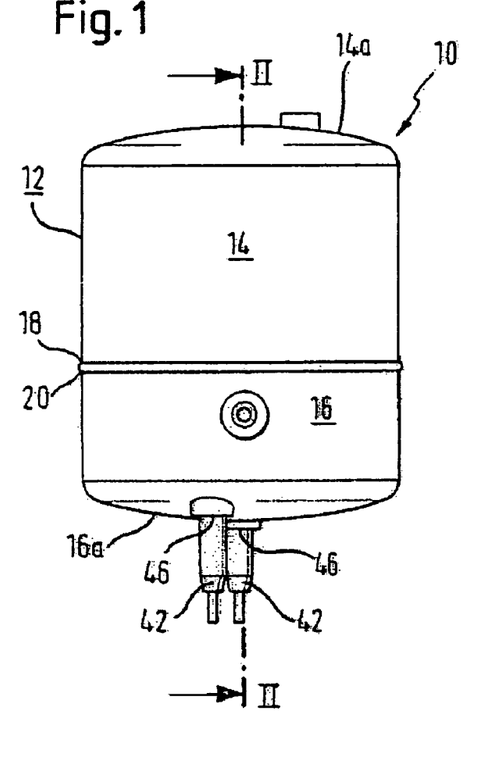
FIG. 1 a side view of a boiler for heating flowable media.

FIG. 1 shows a boiler (10) according to one embodiment in a side view. The housing (12) of the boiler (10) includes an upper housing (14) and of a lower housing (16), both are made from plastic, preferably in a two component molding process. Both housing parts (14) and (16) are shaped like a pot, having rotational symmetry and being geometrically similar, wherein their external and internal shapes are identical. The upper housing part (14) has a larger depth and axial length than the lower housing part (16). When the housing parts (14) and (16) are assembled, the boiler (10) is shaped like a cylinder, as can be seen from FIG. 1 and FIG. 2. The upper and lower walls (14a, 16a) of the cylinder protrude outwardly in a slightly convex manner.

Figure 15A:
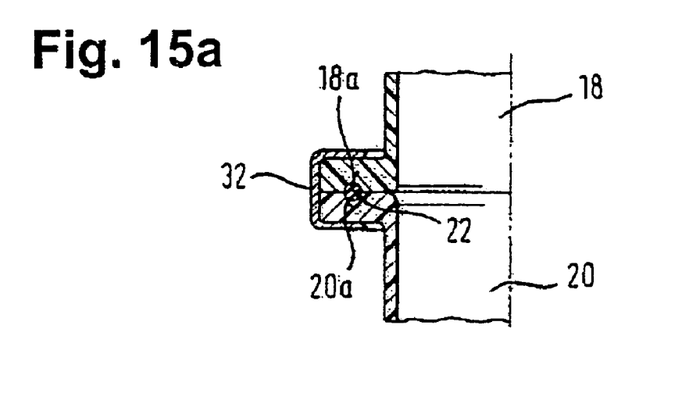
FIGS. 15a-c partial cutout views of the joints of a boiler, which consists of two housing parts.
Figure 15B:
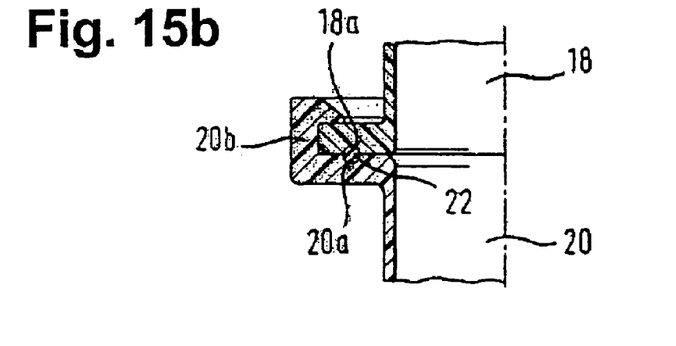
Figure 15C:
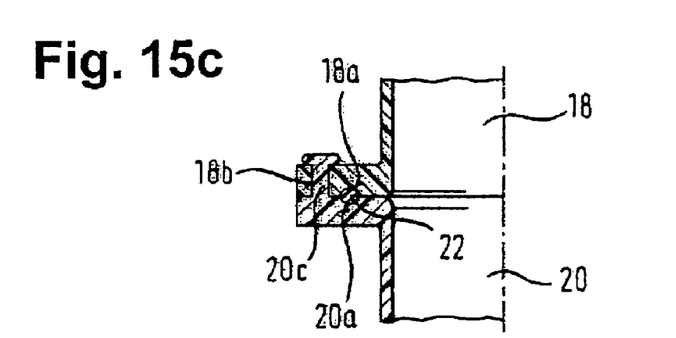

The housing parts (14, 16) include fully circumferential flanges (18, 20), respectively. The flanges (18, 20) can abut each other in a completely flat manner all the way around as can be seen in FIGS. 14a to 14c. Both flanges (18, 20) protrude outwardly from the outside of the free end of the wall of the respective housing parts (14, 16) at an angle of approximately 90° to the respective outside surfaces of the housing parts (14, 16). In the middle of their contact surfaces, both flanges (18, 20) have a semi cylindrical, fully circumferential recess (18a, 20a), into which a gasket element (22) is inserted.

As can be seen from FIGS. 15a through 15c, both flanges (18, 20) and thereby both housing parts (14, 16) can be connected in various ways. The embodiment shown in FIG. 15a uses a metal clamp (32) with a C-shaped cross section, which can encompass completely or partially the two flanges (18, 20), or which can encompass the two flanges (18, 20) in two half rings or in a C-shape as seen from above. The C-shaped metal clamp (32) is elastic, wherein the distance at the free ends of the "C" is smaller than the thickness of the two flanges (18, 20) superposed each other. Therefore the clamp (32) has to be opened to push it onto the two flanges (18, 20). The elastic force can be generally vertical to the horizontal surfaces of the two flanges (18, 20) shown in the embodiments presses the two flanges (18, 20) against each other and thereby creates a fluid tight seal between the housing parts (14, 16) in combination with the gasket element (22).

In an embodiment shown in FIG. 15b, the flange (20) of the lower housing (16) has a preferably elastic, at least partially circumferential wraparound snapping hook (20b), reaching over the flange (18) of the upper housing (14). Through the elasticity of the snapping hook (20b) a force perpendicular to the horizontal flange surfaces and contact surfaces is created, so both flanges (18, 20) are pressed against each other establishing a fluid tight seal between the housing parts (14, 16) together with the gasket element (22).

In the embodiment shown in FIG. 15c, both flanges (18, 20), and thus both housing parts (14, 16), are joined via hot embossing. The flange (20) of the bottom housing part (18) is provided with several studs (20c) spaced along the circumference of the flange (20). The studs (20c) are substantially perpendicular to the flange and contact surfaces and pointing towards the flange (18) of the upper housing part (14) when assembled. The studs (20c) extend through holes (18b) of the flange (18) of the upper housing part (14). The axial lengths of the studs (20c) are larger than the axial lengths of the holes (18b) of the flange (18) of the housing part (14). After inserting the studs (20c), their ends protruding beyond the flange (18) of the upper housing part (14) are plastically deformed through heating, whereby the created flat surfaces, which are not designated in detail, reach over the edges of through holes (18b) of the flange (18). When both flanges (18, 20) are pressed onto each other during the heating and during the hardening of the studs (20c), an elastic compression is created, which provides for a tight connection between the two housing parts (14, 16). It has to be noted, that instead of several studs (20c) also annular sections of the flange (20) can be provided, reaching through corresponding slots in the flange (18).

Figure 2:
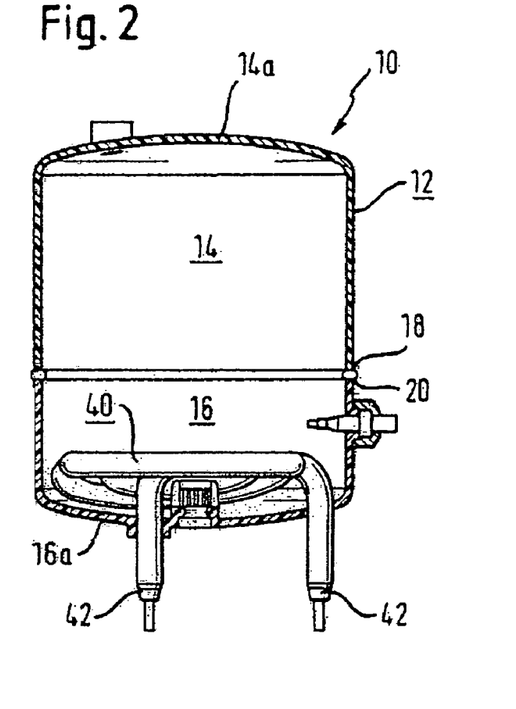
FIG. 2 a vertical cut view through the boiler shown in FIG. 1 along the cut line II-II in FIG. 1.

In some embodiments, a boiler (10) has a heater (40), which is provided as a tubular heater of known design. The tubular heater (40), which has a circular cross section, extends through the lower front wall (16a) of the lower housing part (16) through the mounting hole (46) with its two free connector ends (42). As can be seen in FIG. 2, the tubular heater (40) inside the boiler (10) has spiral windings, with the spiral located approximately in a horizontal plane. Thus, the spiral winding is close to the lower wall (16a) of the lower housing (16).

Figure 3:
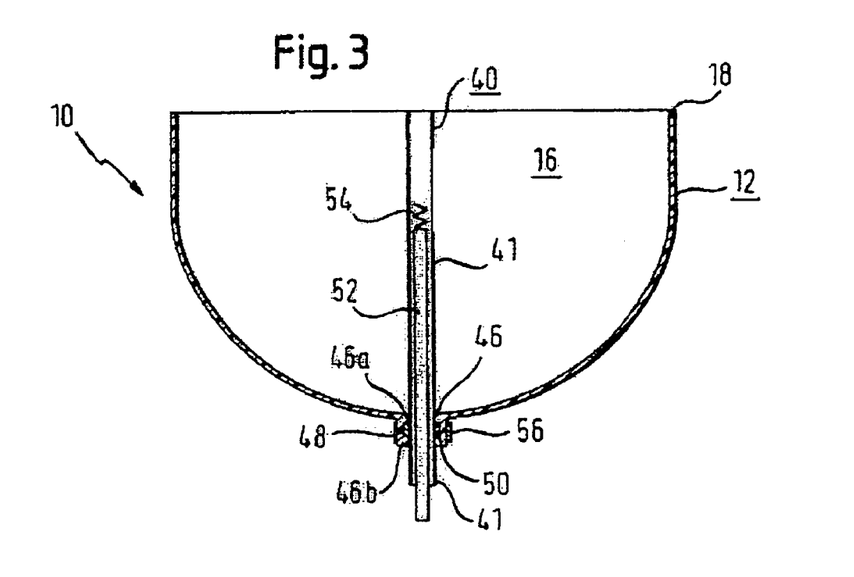
FIG. 3 a horizontal cut view of a further embodiment of a boiler.

FIG. 3 shows a boiler (10) that is general similar to boiler (10) of FIG. 1 and FIG. 2. The illustrated boiler (10) has a slightly different outer contour than the outer contour of the boiler of FIGS. 1 and 2. In the embodiment shown in FIG. 3 the boiler (10) is shown in a horizontal cut, wherein the middle longitudinal axis of the heater (40) is also horizontal. Different from the embodiment shown in FIGS. 1 and 2, the tubular heater (40) extends straight into the interior (12) of the boiler (10).

The mounting hole (46) has a tubular cross section like the tubular heater (40). As can be seen from FIG. (3), the mounting hole (46) is not only formed by the circular hole in the wall of the lower housing part (16), but there is an additional extension (48) attached to the mounting hole (46). The extension (48) is integrally formed with the exterior wall of the housing in a way that the longitudinal axis of the extension (48) coincides with the longitudinal axis of the hole in the wall of the lower housing part (16). The extension (48) has a cylindrical external contour.

With continued reference to FIG. 3, the interior wall of the mounting hole (46) has two annular sections (46a, 46b) that abut the exterior wall of the tubular heater (40). The two sections (46a) and (46b) are located at the opposing ends of the mounting hole (46). The sections (46a, 46b) are located at inner end and outer end of the mounting hole (46). The space between both sections (46a, 46b) holds a gasket (50), which is inserted into this space before mounting the heater (40), or which is sprayed onto the heater (40) before mounting it in the mounting hole (46).

FIG. 3 shows the tubular heater (40) having a rather long unheated connector end (42). This connector end is formed by a slender cylindrical connection bolt (52) made from an electrically conductive material, which is centrally located in the interior of the tubular heater (40) and which is connected rather deep inside the boiler (10) to a heat spiral (54) made of electrical resistor wire. It is hereby accomplished that the heat emitted by the heater (40) does not damage the mounting hole (46) or the housing sections in its proximity. Hereby the axial length of the section of the unheated end (42) of the tubular heater (40) pointing towards the interior of the boiler (10) or the axial length of the connection bolt (52) are greater than the axial length of the outward pointing section of the unheated end (42) or the connection bolt (52). As explained, a sufficient spacing between the heated section of the heater (40), beginning with the heater coil wire (54) and the wall of the lower housing (16), is provided. Thus, damage to the wall of the housing (16), the mounting hole (46), and/or the gasket (50) is reliably avoided, even in case the heater (40) runs dry. It has to be noted that the connecting bolt (52) protrudes from the tube (41) of the heater (40), spaced away from the outside of the mounting hole (46), allowing the connection with an electrical power source.

A support ring (56), preferably made from metal, is slid or pressed onto the outside of the extension (48). The support ring (56), which can be a completely circular ring or a C-shaped ring, has an interior diameter substantially equal to the exterior diameter of the extension (48). The support ring (56) is plastically deformed after applying it to the extension (48) such that the ring (56) compresses the extension (48). In this manner, the support ring (56) fixates the heater (40) in the interior of the mounting hole (46). Furthermore, the support ring (56) can provide a sufficient compressive force to the gasket (50) over the life of the boiler (10). Because the extension (48) is made of plastic and the tubular heater (40) has an outer tube made from stainless steel, they may have different coefficients of thermal expansion. The compressive force, however, may maintain the proper positioning of the gasket (50), even when the extension (48) and heater (40) are heated. The materials forming the plastic boiler (10) and for the heater (40) can be selected so that the support ring (56) is not needed. Through an appropriate design the support ring (56) can also be used for grounding the tubular heater (40).

FIGS. 4 through 13 show different embodiments of the tubular heater (40) fixedly retained in the mounting hole (46)These embodiments are generally similar to one another, except as detailed below. Elements of one embodiment can certainly be combined with elements of other embodiments.

Figure 4:
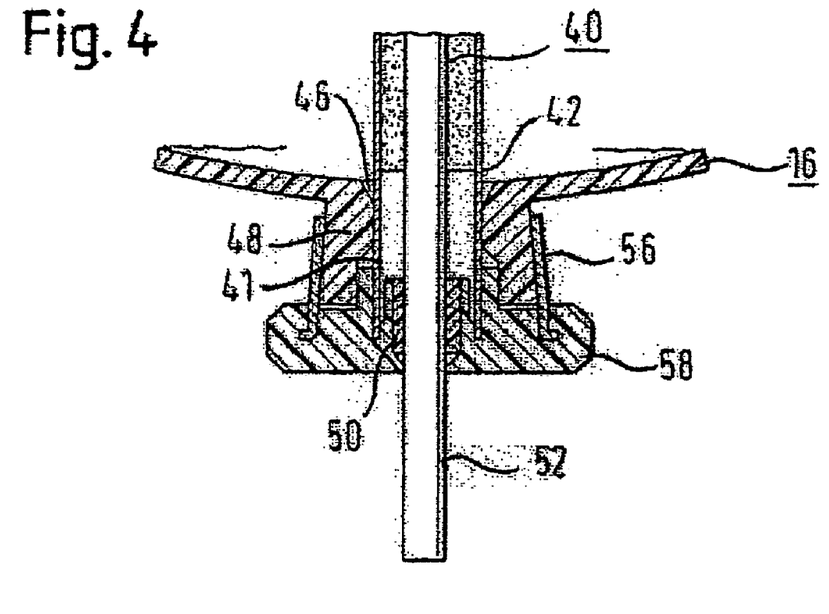
FIG. 4 a detailed cross section of a heater inserted into a mounting hole of a boiler housing.

In FIG. 4 a first variant is shown, wherein the tubular heater (40) is held, preferably with a plastic isolation bead (58), in the mounting hole (46). The isolation bead (58) is applied to the outside of the tubular heater (40) and is preferably attached to it. The support ring (56) is connected to the Isolation bead (58) in a rigid manner. The rigid connection can be accomplished through embedding the ring (56) in the bead (56) during the casting process of the bead (58). The function and the attachment of the support ring (56) in this embodiment are the same as for the support ring (56) in FIG. 3.

Figure 5:
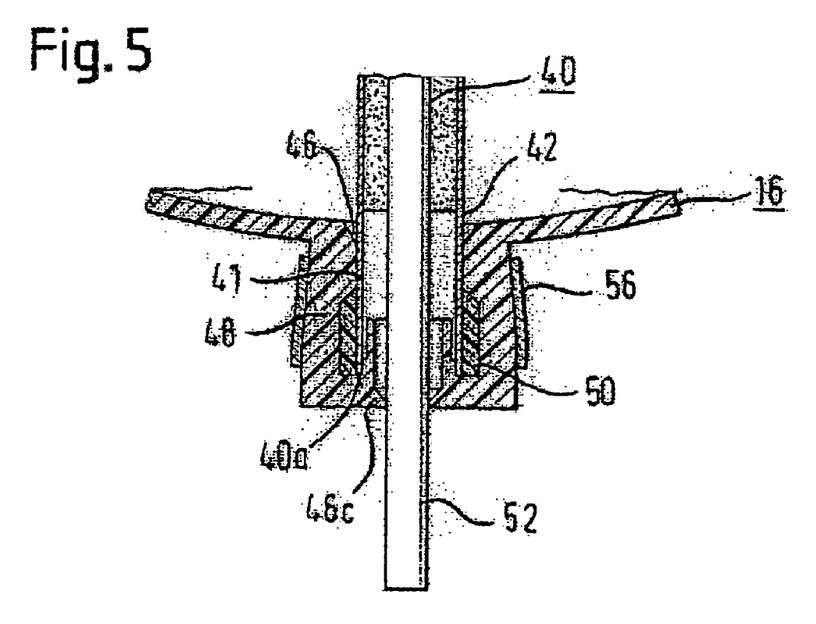
FIG. 5 a further embodiment of a design for a mounting hole in a boiler housing and for holding a heater in the mounting hole.

FIG. 5 shows an embodiment of the mounting hole (46) having a contraction or narrowed section (46c) proximate its outer edge, whose interior diameter is substantially equal to the outer diameter of the connecting bolt (52) of the tubular heater (40). In this embodiment the tubular heater (40) is inserted from the interior of the housing (14) or (16) until the frontal edge (40a) of the outer tube of the tube heater (40) abuts against the contraction (46c). The connecting bolt (52) of the tubular heater (40) can be moved through the contraction (46c) until in the desired position. Subsequently, the support ring (56) can be slipped and pressed onto the extension (48) from the outside, as explained above in connection with FIG. 3.

Figure 6:
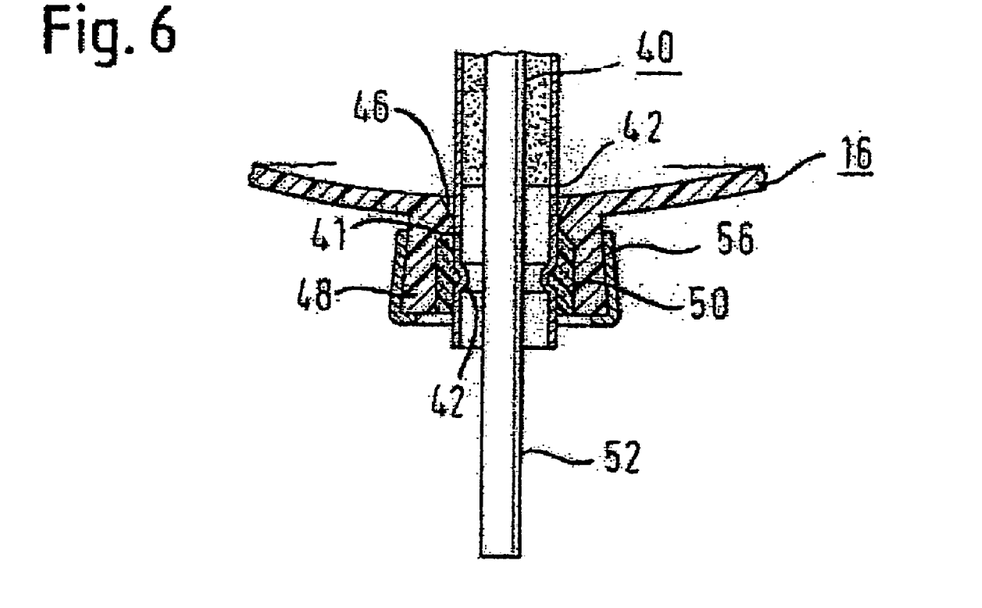
FIG. 6 a third alternative embodiment of a design for a mounting hole in a boiler housing and for positioning a heater in the mounting hole.

An embodiment shown in FIG. 6 is different from the previous embodiments, in so far as the tubular heater (40) is inserted into the mounting hole (46) in a manner where the tubular heater (40) is encased during the injection molding of the housing parts (14) and (16) and where the mounting hole (46) is formed during the injection molding process. The tubular heater (40) can be provided with a spray on gasket (50). A support ring (56) can also be provided. In order to increase the adherence of the gasket (50) to the tubular heater (40), a contraction or narrowed section (42) can be provided on the outer tube (41) of the tubular heater (40). The illustrated narrowed section (42) is in the form of an annular recess. Other types of narrowed sections can also be used.

Figure 7:
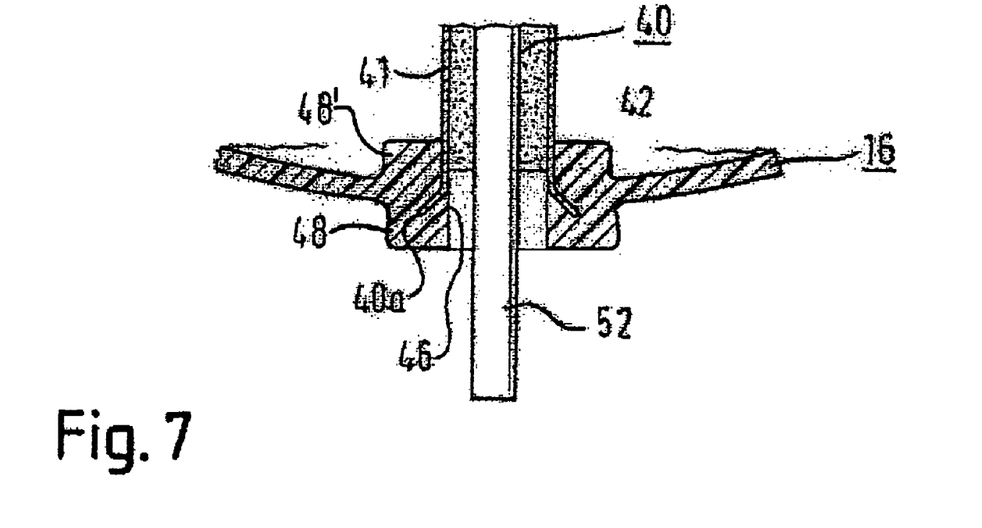
FIG. 7 a fourth alternative embodiment of a design for a mounting hole in a boiler housing and for positioning a heater in the mounting hole.

FIG. 7 shows an embodiment of the outer tube of the tube heater (40) having a widened frontal end (40a) inserted into the mounting hole (46) simultaneously during the injection molding process of the housing parts (14) and (16). In other words, it is directly injection molded around the widened end of the outer tube of the tube heater (40) such that the mounting hole (46) is formed during the injection molding process and that after the injection molding process the tube heater (40) is directly integrated into the respective housing part (14) and (16). The frontal end (40a) of the outer tube of the tube heater (40) and the longitudinal axis of the mounting hole (46) can form an obtuse or acute included angle. In the embodiment shown in FIG. 7, the frontal end (40a) of the outer tube of the tube heater (40) is formed like a hopper or funnel. The widened section of the frontal end (40a) is generally aligned with the longitudinal axis of the mounting hole (46). In the illustrated embodiment, the inner surface of the widened section and the longitudinal axis of the mounting hole (46) define an arcuate angle. As such, the outer tube has, at its frontal end (40a), an greater diameter than the inner diameter of the mounting hole (46) and is reduced or narrowed in direction to the inside of the boiler up to the normal diameter of the outer tube of the tube heater (40).

The embodiment of FIG. 7 differs from the embodiments described, for example, in FIGS. 4, 5, and 6 in so far as there is an additional extension or protrusion (48') extending towards the inside of the boiler (10). The illustrated extension (48') extending inwardly from the inner wall of the boiler (10), in addition to the outwardly extending extension (48). Thus, the thickness of the wall of the boiler around the mounting hole (46) or the effective length of the mounting hole (46) is increased resulting in improved fixation and support of the tube of the tube heater (40). It is noted that it is also possible to scale up one of the extensions (48) and (48') such that the respective other extension can be scaled down or omitted, respectively. Finally, the thickness of the wall of the boiler (10) may also be designed such that none of the extensions are present.

It is worth noting that in the fourth embodiment, tube heater (40) can, additionally, be provided with one or several spray on gasket(s) next to or adjacent to the widened end. The gaskets can be similar to the gasket (50) discussed in connection with the embodiments of FIGS. 4, 5, and 6, above. In order to increase the adherence of the tubular heater (40) in the mounting hole (46), one or several contraction(s) (similar to the contradiction (42) shown, for example, in FIG. 6) and/or one or several expansion(s) (as the expansion of the tube of the tubular heater shown, for example, in FIG. 12) may be additionally provided on the outer tube (41) of the tubular heater (40). A further option is to provide an additional support ring, such as the support ring (56) described above.

Figure 8:
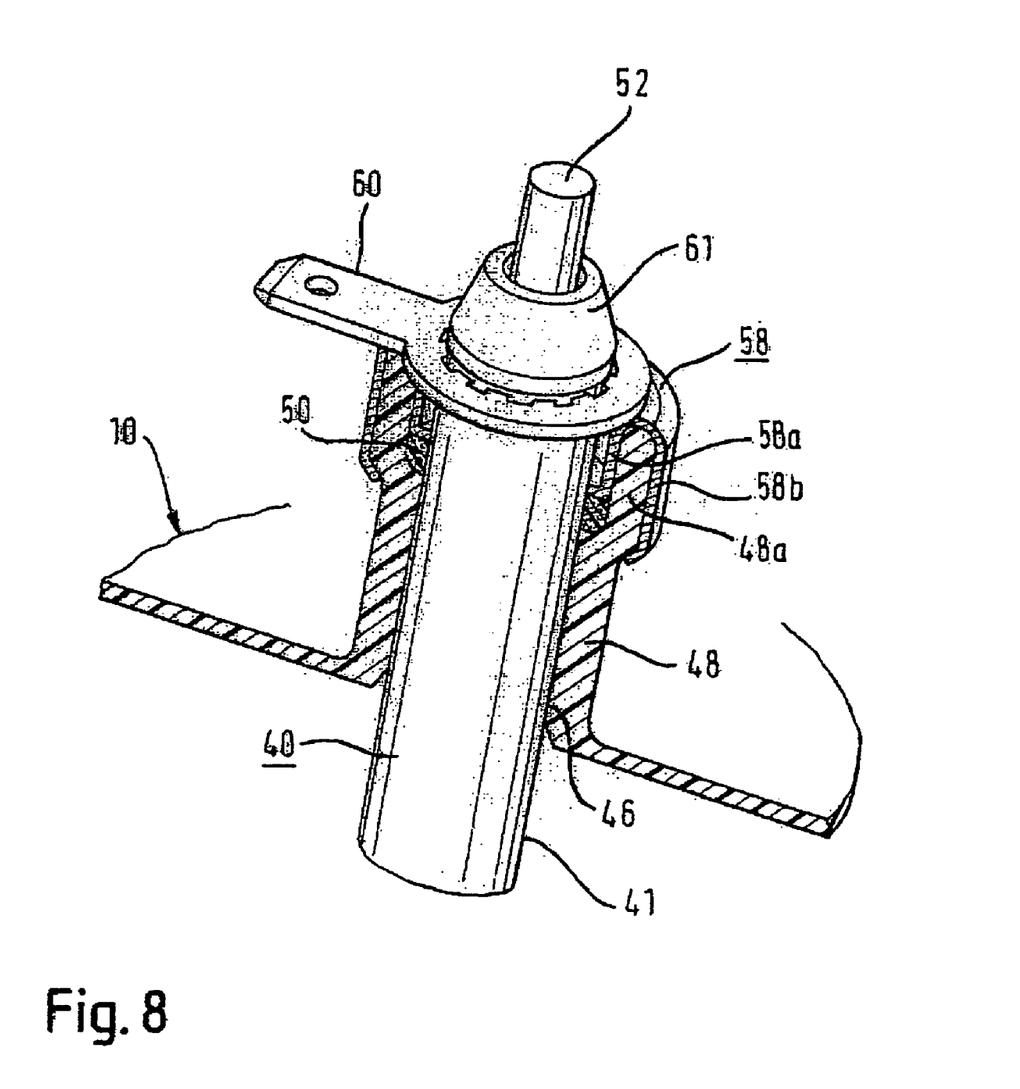
FIG. 8 a fifth alternative embodiment of a design for a mounting hole in a boiler housing and for positioning a heater in the mounting hole.

FIG. 8 shows a fifth embodiment for fixedly retaining the heater (40) in a mounting hole (46). This embodiment differs from the embodiment described in FIG. 4 in so far as the extension (48) has a fully circumferential expansion (48a) at its end, which points towards the outside of the boiler (10). The gasket element (50) in the form of an 0-ring is inserted into this expansion (48a). The fixation means is provided in this embodiment in the form of a clamping tube (58). The clamping tube (58) has double walls formed by two sections (58a, 58b).

The clamping tube (58) is pushed over the expansion (48a) of the extension (48). As illustrated in FIG. 8, the expansion (48a) is interposed between the two sections (58a, 58b). The two wall sections (58a, 58b) of the clamping tube (58) are connected with a floor element, which is not designated in detail and whose round cross section contour is adapted to the contour of the expansion (48a) of the extension (48) as can be seen from FIG. 8. The axial length of the clamping tube (58) is selected in a way that it reaches beyond the end of the expansion (48a) of the extension (48) with the exterior wall section (58a), which is axially longer than the interior wall section (58b). The free end of this wall section (58a) is then plastically deformed such that the clamping tube (58) is affixed to the expansion (48a) of the extension (48). A ground speed nut (60) is applied to the free end of the tubular heater (40) and the outer tube (41). The speed nut (60) can function as, for example, a mass or ground potential connection. The outer tube of the heater (40) is closed in a fluid tight manner by the isolation bead (61).

Figure 9:
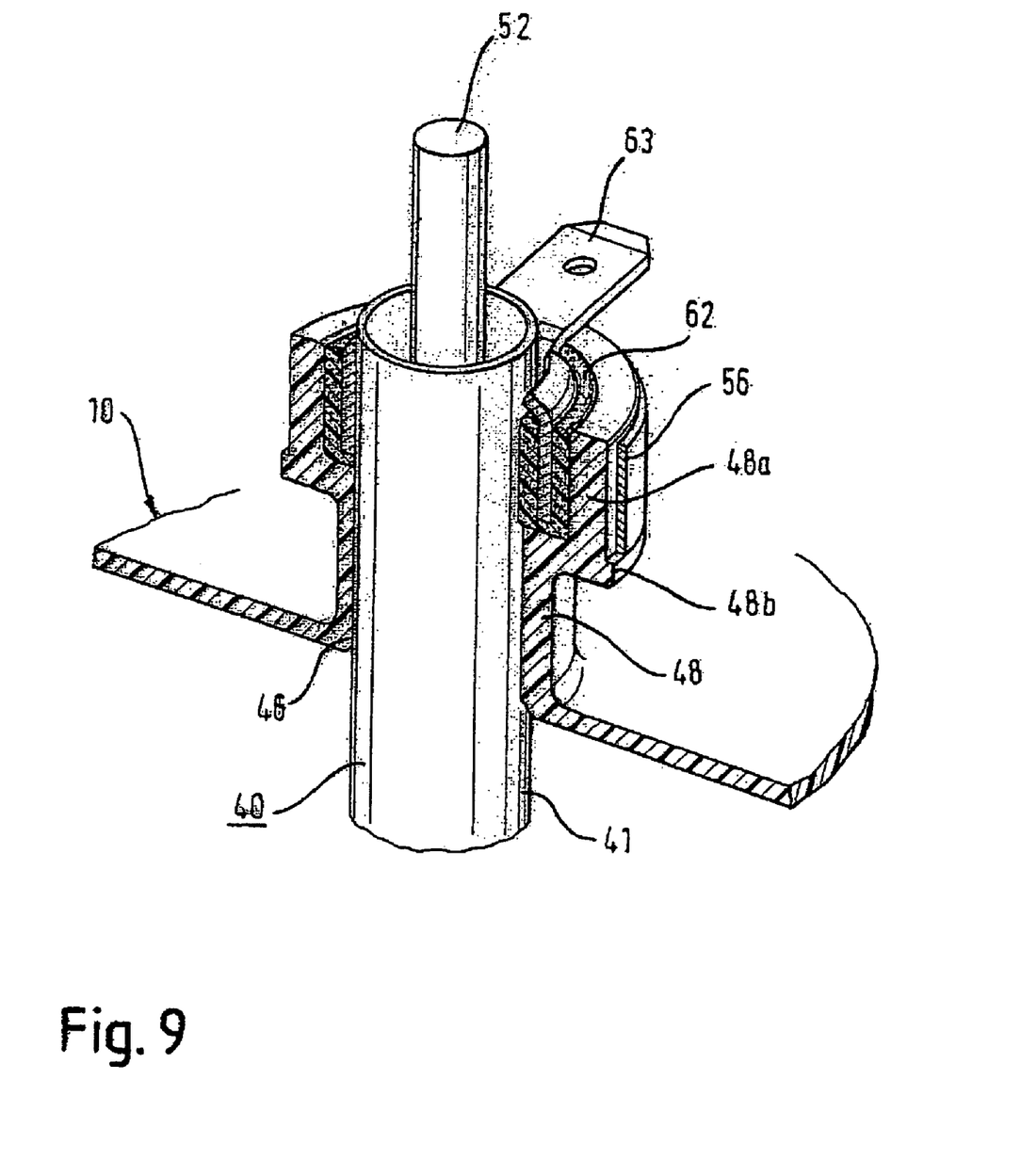
FIG. 9 a sixth alternative embodiment of a design of a mounting hole in a boiler housing and for positioning a heater in the mounting hole.

A sixth embodiment of a mounting hole (46) as shown in FIG. 9 differs from the embodiment in FIG. 8 because the expansion (48a) of the extension (48) has a radial step extending a substantial distance in the outward radial direction. In the ensuing gap between the exterior of the outer tube (41) and the interior surface of the expansion (48a), a double wall gasket element (62) is inserted, with its opening formed by the two wall sections, pointing outward. As can be seen from FIG. 9, the gasket element (62) in its connection area and in its bottom is adapted to the shape and to the step of the expansion (48a). A ground tube (63) is inserted in the gap formed by the two sections of the double wall. The outward facing edge of the ground tube (63) is flared towards the outer tube (41) of the of the tube heater (40).

The outer portion of the expansion (48a) defines a circumferential step (48b). In the illustrated embodiment, one end of the step (48b) is proximate the section of the extension (48) having an inner diameter substantially equal to the outer diameter of the outer tube (41). The support ring (56) is slipped or pressed onto the step (48b). It should be noted that FIG. 9 does not show the isolation bead (61), which is shown in FIG. 8, though it is present in the operational state of the boiler (10).

Figure 10:
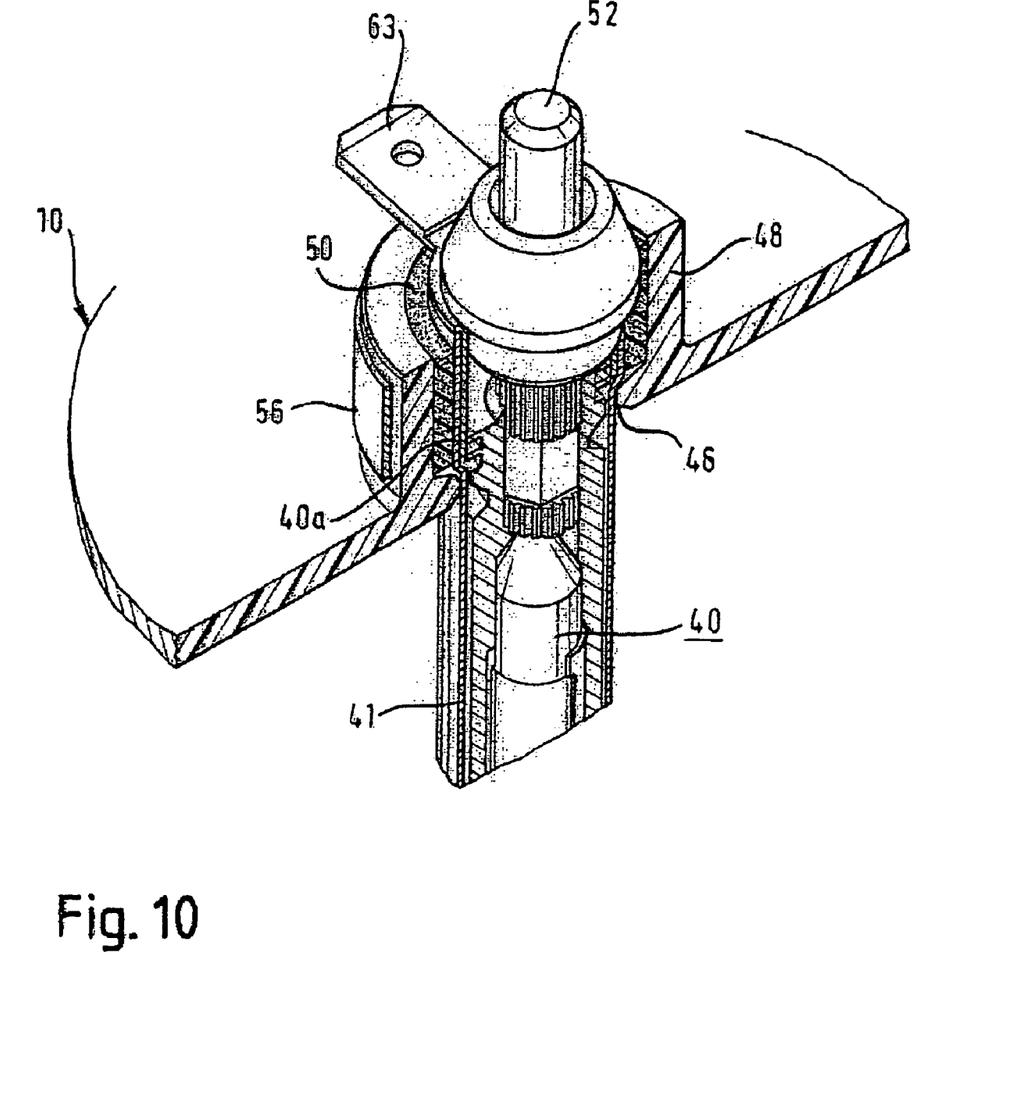
FIG. 10 a seventh alternative embodiment of a design of a mounting hole in a boiler housing and for positioning the heater in the mounting hole.

In a seventh embodiment of the mounting hole (46) shown in FIG. 10, the extension (48) has a larger inner diameter than the inner diameter of the mounting hole (46) in the wall of the housing of the boiler (10). In this embodiment, the front end of the outer tube (41) of the heater (40) has an expansion (40a) which reaches over the edges of the mounting hole (46). A gasket element (50) is inserted into the space inside the interior wall of the extension (48), having an exterior diameter larger than the exterior diameter of the expansion (40a) of the heater (40). The gasket element can be inserted or sprayed onto the expansion (40a) of the outer tube (41). The gasket element (50) is also expanded when the expansion (40a) is manufactured. In the area of the expansion (40a), a tube (63) with a flat ground wire plug is inserted and serves as a ground connection for the heater (40). A support ring (56) is provided on the outside of the extension (48).

Figure 11:
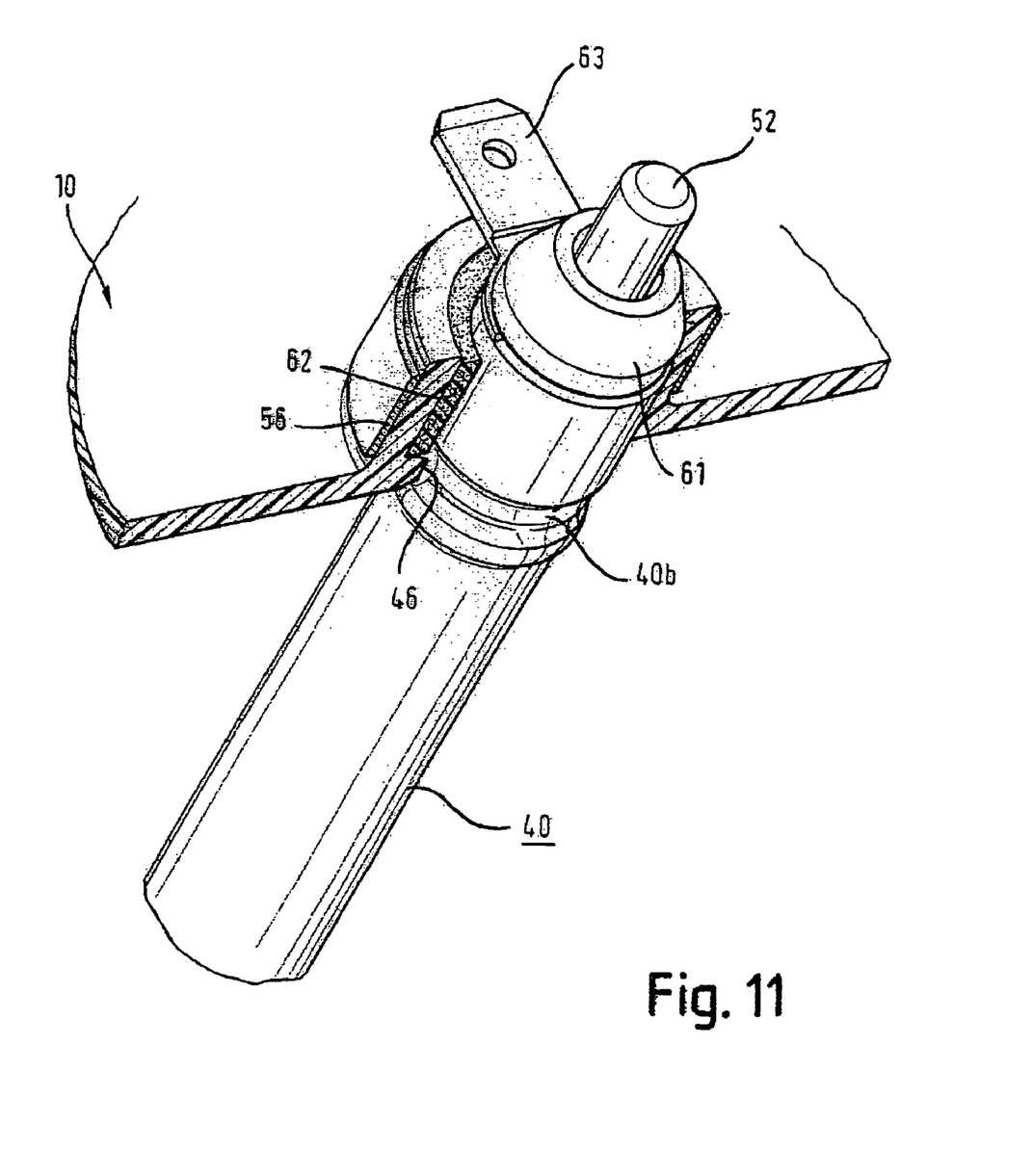
FIGS. 11, 12 an eighth alternative embodiment of a design of a mounting hole in a boiler housing and for positioning a heater in the mounting hole.
Figure 12:
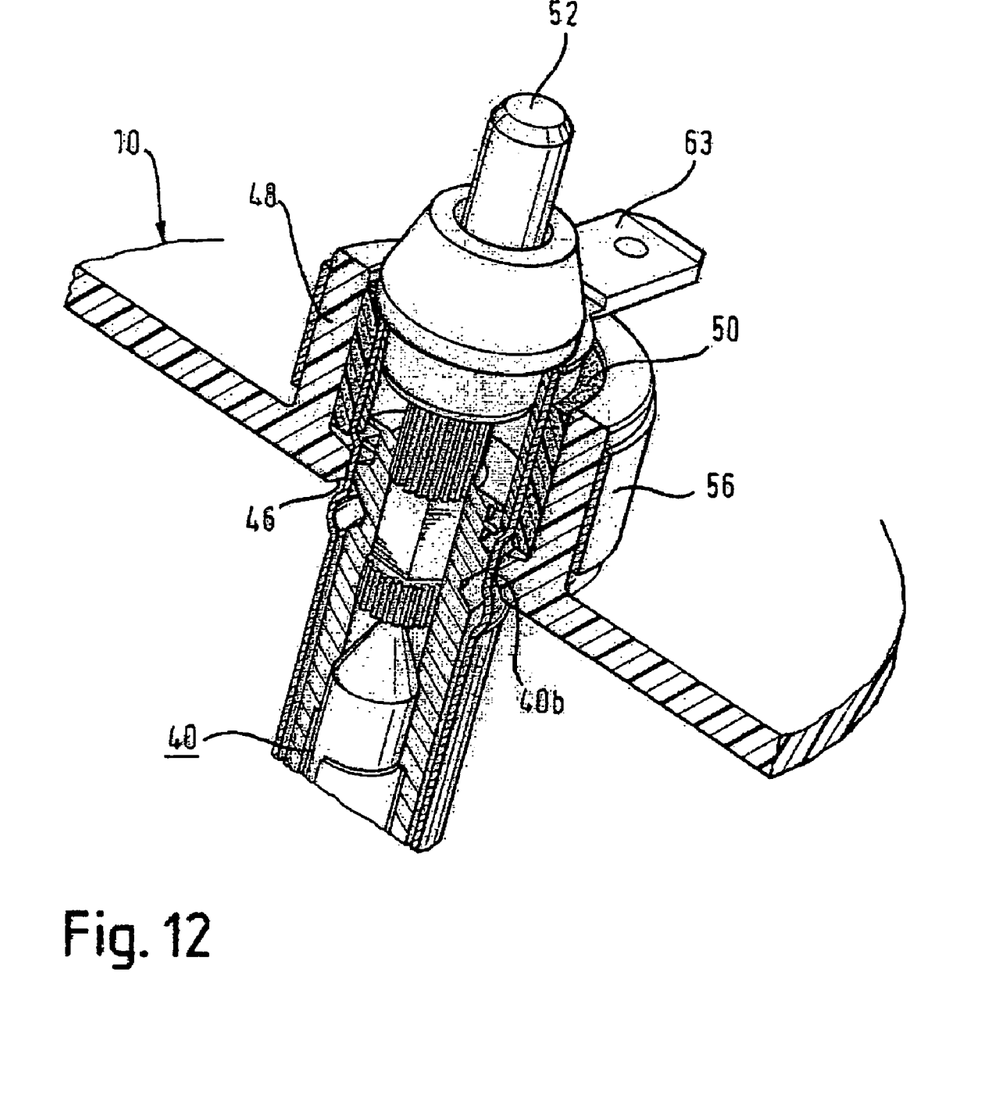

An eighth embodiment shown in FIG. 11 and FIG. 12 differs from the embodiment in FIG. 10 in so far as the outer tube (41) of the heater (40) has a circumferential recess (40b) extending from the wall of the housing (12) of the boiler (10) towards the inside, into which the edge of the mounting hole (46) protrudes. In this manner, the heater (40) is axially fixated in the outward and in inward directions.

Figure 13:
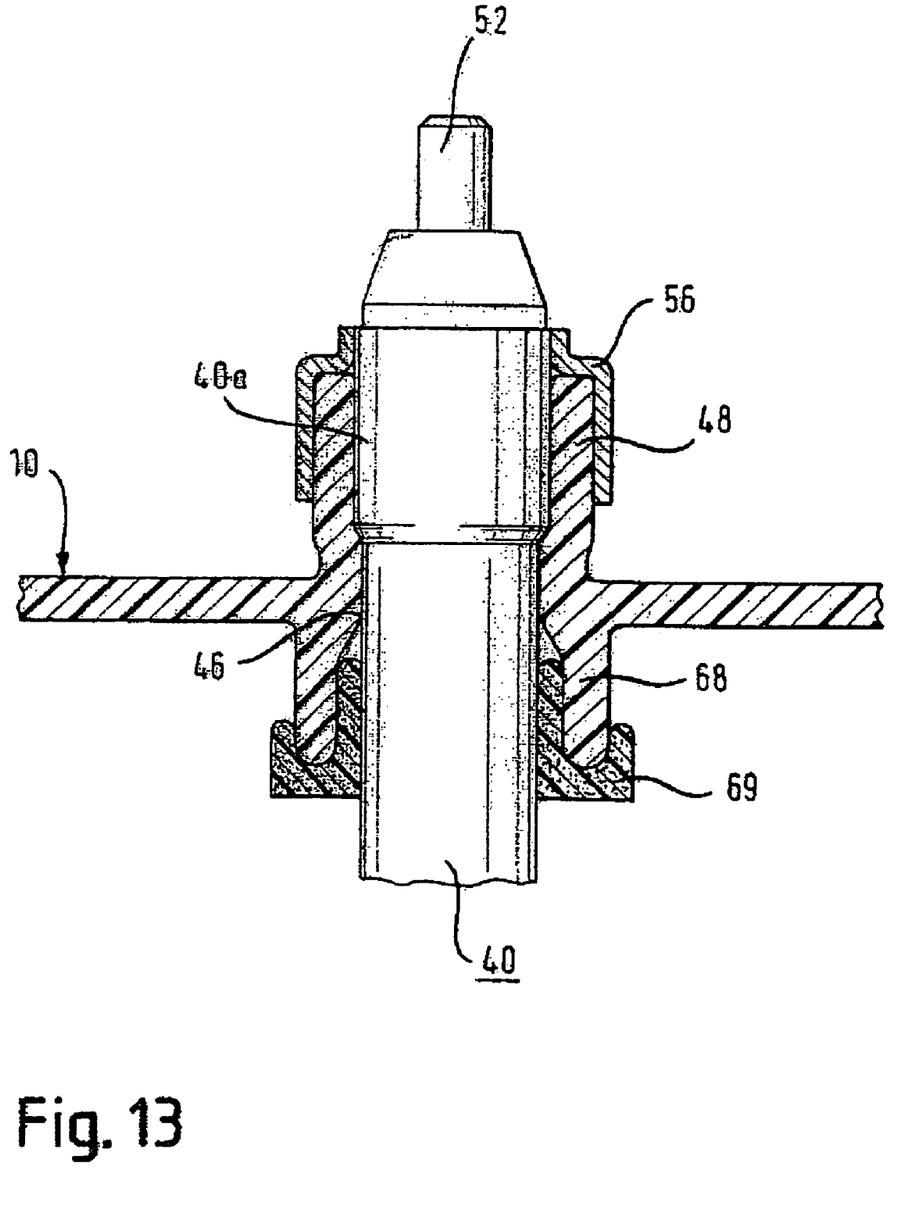
FIGS. 13, 14 a ninth alternative embodiment of a design of a mounting hole in a boiler housing and for positioning a heater in the mounting hole.
Figure 14:
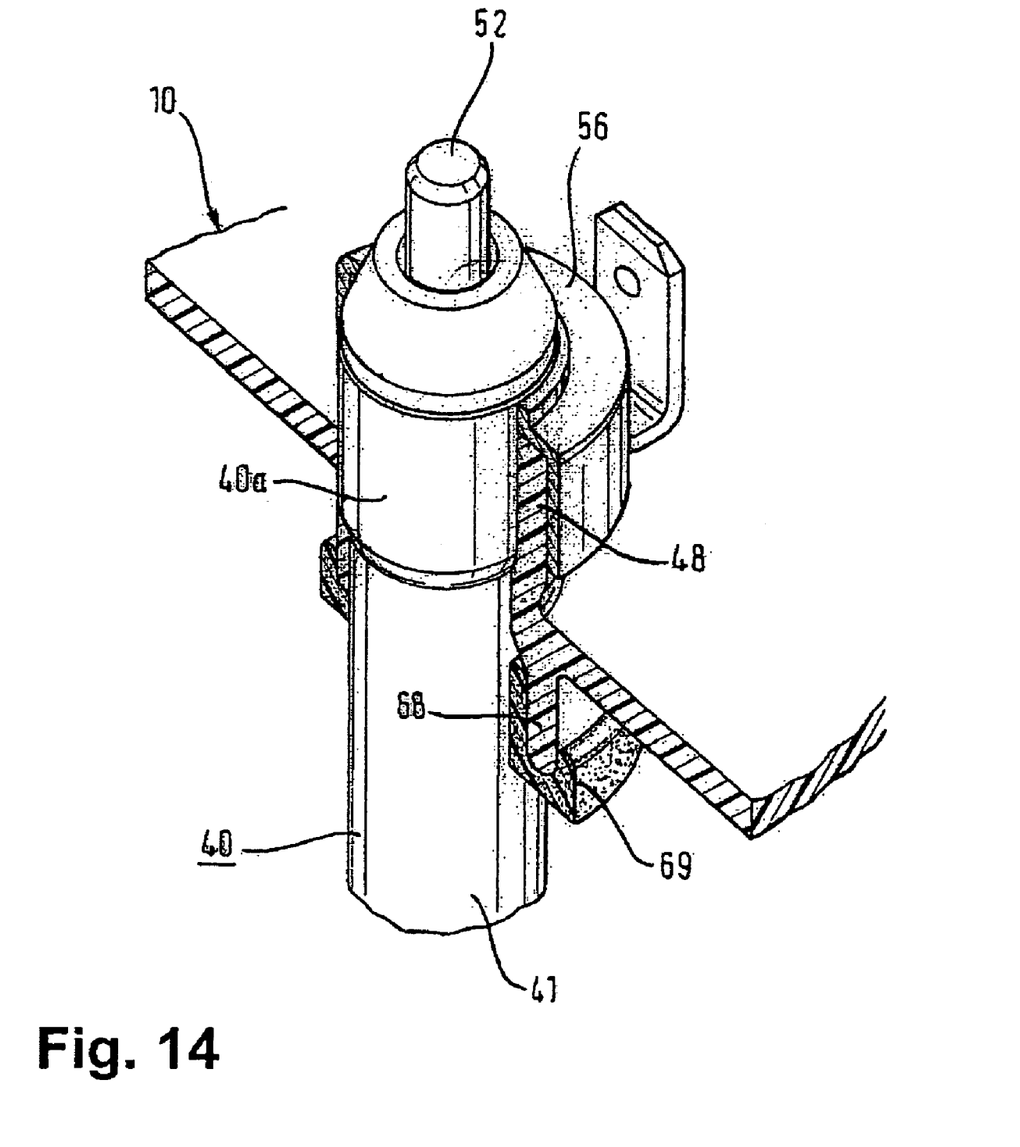

FIG. 13 and in FIG. 14 show a ninth embodiment having an extension (48) extending from the inside and outside of the housing (12) of the boiler (10). The illustrated extension (48) has extension (68) configured to accept a double wall gasket element (69). When installed, the extension (68) can be interposed between the walls of the gasket element (69). As shown in FIG. 13, the interior diameter of the extensions (48, 68) is larger than the exterior diameter of the heater (40). In the area of the extension (68), the interior section of the double wall gasket element (69) forms a seal. In the area of the extension (48), the outer tube (41) of the heater (40) is provided with an expansion (40a). The support ring (56) is slid onto the exterior extension (48) and then flared. The aforementioned has a flat grounding plug.

Figure 16:
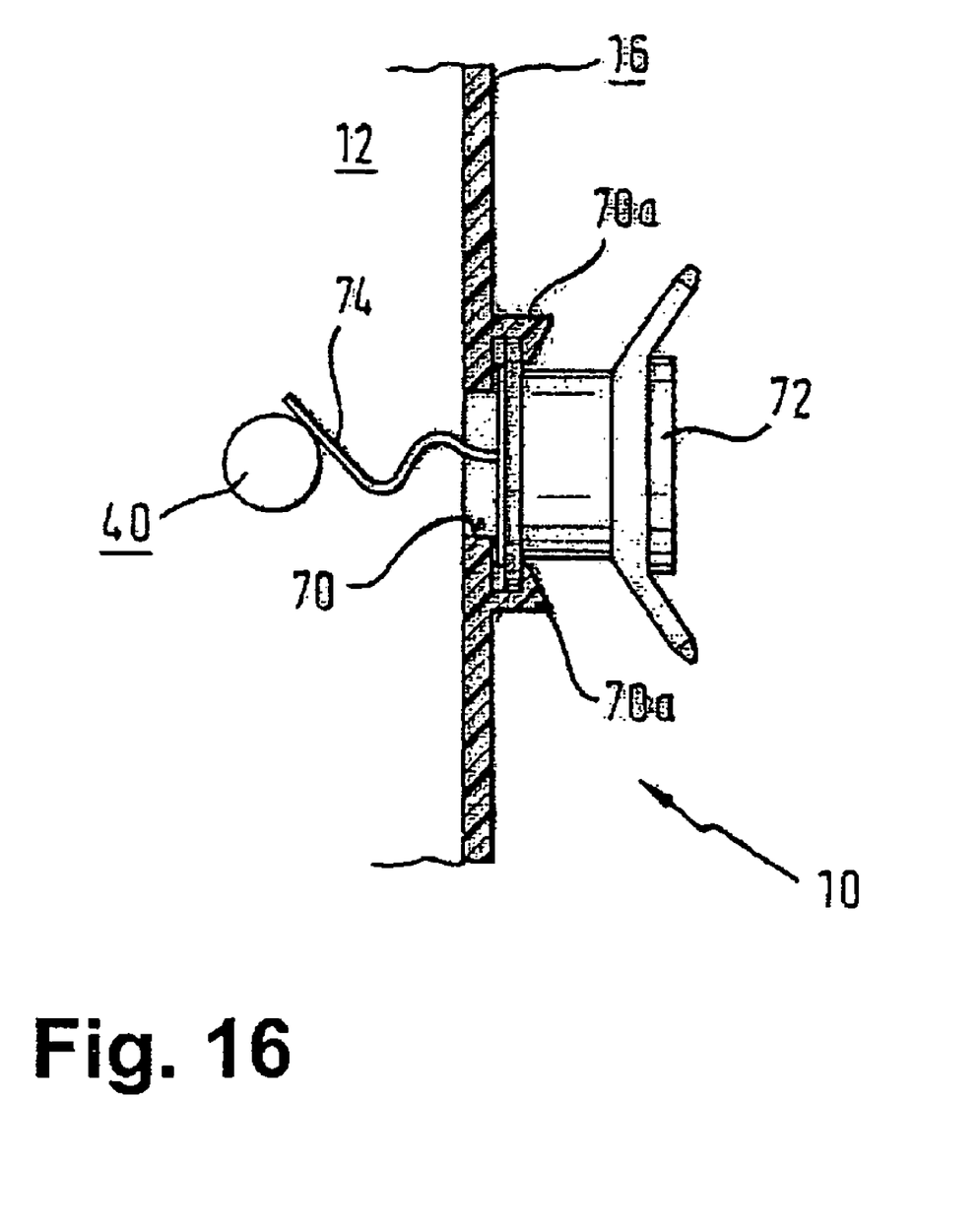
FIG. 16 a partial cutout view of a boiler housing with a mounting hole for a control unit.

FIG. 16 shows another mounting hole (70), preferably circular, in the housing (12) of the boiler (10) or in one of the housing parts (14) or (16). This mounting hole (70) can be configured to hold a control unit (72) in the wall of the housing. As can be seen from FIG. 16, the control unit (72) is being held in the mounting hole (70) by elastic snap hooks (70a). The hooks (70a) can be attached to the outside of the mounting hole (70). If needed or desired, gasket elements (not shown) can also be utilized. The illustrated control unit (72) has a generally cylindrical outer surface. The control unit (72) can have other configurations.

The control unit (72) is in contact with the heater (40) via a corrugated sheet metal heat conductor, so that the control unit (72) senses the temperature of the heater (40). The corrugation of the heat conductor (74) compensates for changes in length due to heating and cooling. It should be noted that the heat conductor (74) can be connected with the heater (40) and/or the control unit (72) through welding or soldering.

While there have been shown and described and pointed out fundamental features of the invention as applied to the exemplary embodiments thereof, it will be understood that various omissions and substitutions and changes in the form and details of the embodiments described may be made by those skilled in the art without departing from the present invention. For example, it is expressly intended that all combinations of those elements, which perform substantially the same function in substantially the same way to achieve the same results, are within the scope of the invention. Moreover, it should be recognized that structures and/or elements and/or described in connection with any disclosed form or embodiment of the invention may be incorporated in any other disclosed or described or suggested form or embodiment as a general matter of designed choice. It is the intention, therefore, to be limited only as indicated by the scope of the claims appended hereto.

Finally, it is noted that the term "comprises" or "comprising" when used in the specification including the claims is intended to specify the presence of stated features, means, steps or components, but does not exclude the presence or addition of one or more other features, means, components or group thereof. Further, the word "a" or "an" preceding an element in a claim does not exclude the presence of a plurality of such elements.

The invention claimed is:

1. A boiler for heating a flowable medium, the boiler comprising a boiler housing made from plastic and a heater, the heater extending through a mounting hole in the boiler housing into an interior of the boiler housing and being fixedly held in the mounting hole, the heater having an unheated section at least in an area of the mounting hole, a diameter of at least a portion of the mounting hole in the boiler housing being at least substantially equal to an outer diameter of the heater, wherein the unheated section of the heater extends inwardly from an interior side of the boiler housing.

2. The boiler according to claim 1, wherein the unheated section of the heater extends outwardly from an exterior side of the boiler housing.

3. The boiler according to claim 1, wherein the unheated section of the heater extending inwardly has a first length, a second length is defined by a portion of the unheated section extending outside of the boiler housing, and the first length is greater than the second length.

4. The boiler according to claim 1, wherein the mounting hole for the heater has a narrowed section positioned proximate an outside surface of the boiler housing, the narrowed section has an inner diameter that is smaller than the outer diameter of the heater, and the narrowed section is configured to abut the heater during assembly.

5. The boiler according to claim 1, further comprising an outwardly extending protrusion located on the boiler housing, the protrusion defining at least a portion of the mounting hole and having an axial length greater than a wall thickness of the boiler housing.

6. The boiler according to claim 1, wherein at least one gasket element is located between an inner surface of the mounting hole and an outer surface of the heater.

7. The boiler according to claim 6, wherein the at least one gasket element is sprayed onto the outer surface of the heater.

8. The boiler according to claim 1, further comprising at least one clamping element that fixates the heater in the mounting hole.

9. The boiler according to claim 8, wherein the at least one clamping element fixates the heater in the mounting hole through plastic deformation.

10. The boiler according to claim 8, wherein the at least one clamping element is integrally formed with an outwardly extending protrusion located on the boiler housing through injection molding, wherein the protrusion defines at least a portion of the mounting hole.

11. The boiler according to claim 8, wherein the at least one clamping element is mounted on an isolation bead, the isolation bead blocking at least a portion of the mounting hole proximate an outside surface of the boiler.

12. The boiler according to claim 8, wherein the at least one clamping element serves as a ground connection for at least the heater.

13. The boiler according to claim 1, wherein the mounting hole is formed by molding around the heater during manufacturing of the boiler housing.

14. The boiler according to claim 1, wherein the mounting hole has an expanded section at its end facing outwardly from the boiler, the expanded section of the mounting hole being configured to engage an expanded section of the heater.

15. The boiler according to claim 1, further comprising at least one additional mounting hole for mounting at least one control unit connected in a thermally conductive manner with a heated section of the heater.

16. The boiler according to claim 15, further comprising a piece of thermally conductive sheet metal that thermally couples a control unit in one of the mounting holes to the heated section of the heater.

17. The boiler according to claim 15, further comprising at least one additional mounting hole for mounting at least one control unit that is in thermal communication with a heated section of the heater through radiation.

18. The boiler according to claim 15, wherein the control unit is formed by at least one of a PTC-element, a NTC-element, a melting fuse, and a controller.

19. The boiler according to claim 15, wherein the control unit is held in the mounting hole through a snapping process.

20. The boiler according to claim 15, wherein the mounting hole is formed by molding around the control unit during manufacturing of the boiler housing.

21. The boiler according to claim 1, wherein the boiler housing comprises at least a first boiler housing and a second boiler housing wherein at least one mounting hole is formed in one of the first and second boiler housings.

22. The boiler according to claim 21, wherein the first boiler housing has a first edge and the second boiler housing has a second edge that mates with the first edge, and at least one gasket disposed between the first edge and the second edge.

23. The boiler according to claim 21 wherein the first boiler housing and the second boiler housing are interlocked or compressed together.

24. The boiler according to claim 15, further comprising one or more fixation elements that hold the at least one control unit in the mounting hole.

25. The boiler according to claim 1, wherein the heater is a tubular heater.

26. A boiler for heating a flowable medium, the boiler comprising a boiler housing formed, at least in part, of plastic, a mounting hole extending through the boiler housing, a heater extending through the mounting hole into an interior region of the boiler housing, and means for fixedly coupling the heater to the boiler housing, wherein the heater has an unheated section in proximity to the mounting hole, a diameter of at least a portion of the mounting hole being substantially equal to an outer diameter of a portion of the heater in the mounting hole, wherein the unheated section of the heater extends inwardly from an interior side of the boiler housing.

27. The boiler of claim 26 wherein the unheated section of the heater extends through the mounting hole.

* * * * *